United States Patent
Veloz, III

(10) Patent No.: US 8,191,007 B1
(45) Date of Patent: May 29, 2012

(54) ORGANIZING A BROWSER ENVIRONMENT

(75) Inventor: Miguel Angel Veloz, III, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/269,456

(22) Filed: Oct. 7, 2011

(51) Int. Cl.
*G06F 3/048* (2006.01)

(52) U.S. Cl. ........ 715/777; 715/776; 715/764; 715/810; 715/842

(58) Field of Classification Search .................. 715/777, 715/776, 764, 234, 810, 842
See application file for complete search history.

(56) References Cited

U.S. PATENT DOCUMENTS

| | | | | |
|---|---|---|---|---|
| 6,049,812 | A * | 4/2000 | Bertram et al. | 715/205 |
| 6,359,634 | B1 * | 3/2002 | Cragun et al. | 715/777 |
| 7,047,499 | B2 * | 5/2006 | Ferri | 715/777 |
| 7,426,697 | B2 * | 9/2008 | Holecek et al. | 715/788 |
| 7,596,760 | B2 * | 9/2009 | Sauve et al. | 715/777 |
| 7,774,366 | B2 * | 8/2010 | Fisher et al. | 707/784 |
| 7,921,365 | B2 * | 4/2011 | Sauve et al. | 715/738 |
| 7,921,372 | B2 * | 4/2011 | Sauve et al. | 715/767 |
| 8,028,245 | B2 * | 9/2011 | Yolleck et al. | 715/777 |
| 2002/0130904 | A1 * | 9/2002 | Becker et al. | 345/753 |
| 2003/0071849 | A1 * | 4/2003 | Ferri | 345/777 |
| 2003/0197735 | A1 * | 10/2003 | Woltzen | 345/777 |
| 2004/0093562 | A1 * | 5/2004 | Diorio et al. | 715/513 |
| 2004/0113948 | A1 * | 6/2004 | Shahrbabaki et al. | 345/777 |
| 2005/0283738 | A1 * | 12/2005 | Beringer et al. | 715/777 |
| 2006/0041830 | A1 * | 2/2006 | Bohn | 715/501.1 |
| 2006/0184537 | A1 * | 8/2006 | Sauve et al. | 707/10 |
| 2006/0206834 | A1 * | 9/2006 | Fisher et al. | 715/777 |
| 2006/0218500 | A1 * | 9/2006 | Sauve et al. | 715/767 |
| 2006/0230356 | A1 * | 10/2006 | Sauve et al. | 715/777 |
| 2006/0271861 | A1 * | 11/2006 | Yolleck et al. | 715/760 |
| 2007/0067733 | A1 * | 3/2007 | Moore et al. | 715/777 |
| 2007/0162864 | A1 * | 7/2007 | Masselle et al. | 715/765 |
| 2007/0186176 | A1 * | 8/2007 | Godley | 715/764 |
| 2008/0005686 | A1 * | 1/2008 | Singh | 715/764 |
| 2008/0141162 | A1 * | 6/2008 | Bockus | 715/777 |
| 2008/0184137 | A1 * | 7/2008 | Grimm et al. | 715/760 |
| 2008/0229231 | A1 * | 9/2008 | Delia et al. | 715/781 |
| 2008/0301562 | A1 * | 12/2008 | Berger et al. | 715/733 |
| 2009/0327947 | A1 * | 12/2009 | Schreiner et al. | 715/777 |
| 2010/0031166 | A1 * | 2/2010 | Choudhary et al. | 715/760 |
| 2010/0031185 | A1 * | 2/2010 | Wilson et al. | 715/777 |
| 2010/0070928 | A1 * | 3/2010 | Goodger et al. | 715/838 |
| 2010/0115450 | A1 * | 5/2010 | Scott et al. | 715/777 |
| 2010/0115451 | A1 * | 5/2010 | Moore et al. | 715/777 |
| 2011/0047275 | A1 * | 2/2011 | Jones et al. | 709/226 |
| 2011/0087984 | A1 * | 4/2011 | Jitkoff et al. | 715/769 |
| 2011/0131523 | A1 * | 6/2011 | Grant et al. | 715/777 |
| 2011/0167376 | A1 * | 7/2011 | Sauve et al. | 715/777 |
| 2011/0179375 | A1 * | 7/2011 | Shupp et al. | 715/777 |
| 2011/0271223 | A1 * | 11/2011 | Cruz Moreno et al. | 715/777 |
| 2011/0271224 | A1 * | 11/2011 | Cruz Moreno et al. | 715/777 |
| 2011/0314407 | A1 * | 12/2011 | Cruz Moreno et al. | 715/777 |

* cited by examiner

*Primary Examiner* — Weilun Lo
*Assistant Examiner* — Rashedul Hassan
(74) *Attorney, Agent, or Firm* — Sterne, Kessler, Goldstein & Fox P.L.L.C.

(57) ABSTRACT

Methods, computer-readable storage mediums encoded with computer programs executed by one or more processors, and systems, for organizing browser windows are disclosed. A selection of one or more tabs of a plurality of tabs arranged on one or more windows of a browser may be received, wherein each of the plurality of tabs corresponds to a web page. The tabs may be grouped based on the selection. The grouped tabs may be arranged on a grouped window of the browser. The grouped window comprising the grouped tabs may be tagged with an identifier that differentiates the grouped window from a remaining one or more windows of the browser not associated with the grouped tabs.

20 Claims, 4 Drawing Sheets

ORGANIZING A BROWSER ENVIRONMENT

BACKGROUND

1. Field

The embodiments herein relate generally to the organization of a browser environment.

2. Background

With the growth in the popularity of the Internet has come a corresponding growth in not only the number of websites accessible to the average user, but also the number of websites the average user accesses. A user will often simultaneously access, or otherwise have open on his/her computing environment at any given time, multiple websites. Each website will be displayed either in its own browser window and/or on a tab within a browser window that may include multiple tabs. However, as the number of websites a user accesses or otherwise has open increases, so too does the difficulty in managing the open windows and/or tabs.

BRIEF SUMMARY

According to an example embodiment, a method is provided. In the exemplary method, a selection of one or more tabs of a plurality of tabs arranged on one or more windows of a browser is received, wherein each of the plurality of tabs corresponds to a web page. Based on the selection, a first grouping of a plurality of tabs is determined, wherein the first grouping includes the one or more tabs of the selection. The one or more tabs of the first grouping are arranged on a first window of the browser. An identifier that identifies the first window including the first grouping is determined, wherein the identifier differentiates the first window from a remaining one or more windows of the browser not associated with the first grouping. The first window is tagged based on the identifier.

According to another example embodiment, a computer readable storage medium has code stored thereon that, when executed by one or more processors, causes the one or more processors to arrange one or more tabs of a browser, corresponding to one or more web pages, into groupings tagged with identifiers that differentiate a first grouping from a second grouping. A selection tool allows a user to select at least one of one or more tabs and one or more web pages corresponding to the one or more tabs for arrangement into one or more groupings. An identifier module determines an identifier for each of the one or more groupings, wherein the identifier differentiates the first grouping from a second grouping. A tagging engine tags the selections of each grouping based on the identifier. A positioner determines that a first selection has been tagged with a first identifier corresponding to a first grouping, and arranges the first selection in a first window of the browser corresponding to the first grouping and tagged with the first identifier.

According to another example embodiment, a system includes a processor and a memory having instructions stored thereon that, when executed by the processor, cause the processor to perform operations. A selection of one or more tabs of a plurality of tabs arranged on one or more windows of a browser is received, wherein each of the plurality of tabs corresponds to a web page. A first grouping of a plurality of tabs is determined based on the selection, wherein the first grouping includes the one or more tabs of the selection. The one or more tabs of the first grouping are arranged on a first window of the browser. An identifier that identifies the first window including the first grouping is determined, wherein the identifier differentiates the first window from a remaining one or more windows of the browser not associated with the first grouping. The first window is tagged based on the identifier.

Further embodiments, features, and advantages, as well as the structure and operation of the various embodiments are described in detail below with reference to accompanying drawings.

BRIEF DESCRIPTION OF THE FIGURES

Embodiments are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Figure 1:
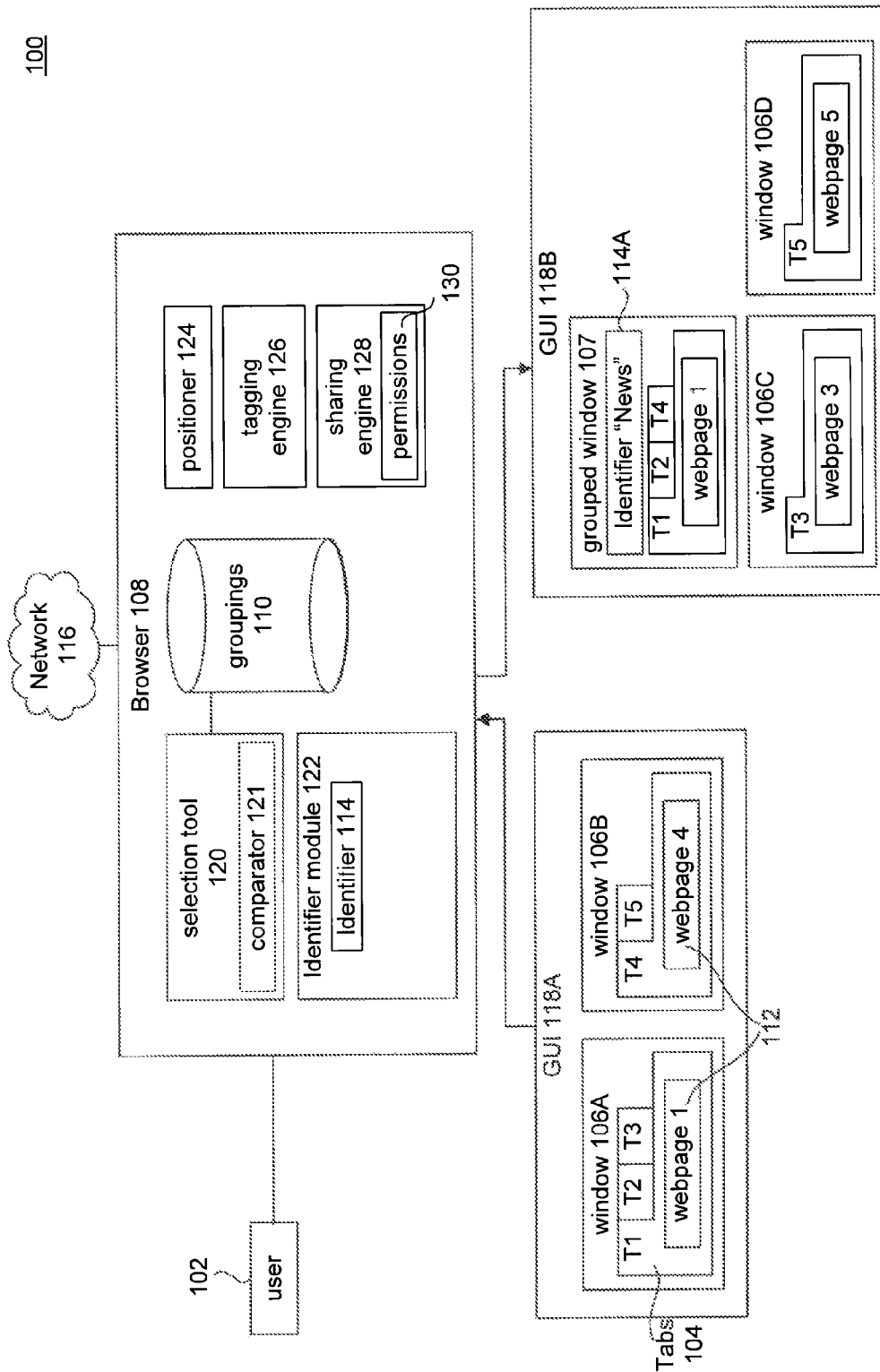
FIG. 1 is a block diagram illustrating a system for organizing a browser environment, according to an example embodiment.

Browser environments, e.g., those computing environments on which a user is operating a web browser, can very quickly become cluttered and disorganized. A user may, for example, open several different browser windows and within each browser window, the user may have open several tabs. As the user opens more browser windows and/or opens more tabs within each browser window, it can be very difficult for the user to remember which webpage or tab has been opened in which window.

The system described herein provides a way for users to organize, group and label the various open browser windows and tabs. The labels or identifiers, as may be determined by individual users, may indicate to the user which tabs and/or websites are open within that window. For example, using the system described herein, if the user labels a particular subset of tabs opened in a window as "Sports", then the user will know that the webpages opened in the tabs of that window are likely to be dealing with sports, such as sports news, team, and intramural sports webpages. Labeling the windows with identifiers, that may be user-defined and/or system generated, allows the user to more quickly identify the location of the webpage that the user is seeking amongst multiple open windows and tabs.

While various embodiments are described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility. Further, when a particular feature, structure, or characteristic is described in connection with an embodiment, it is submitted that it is within the knowledge of one skilled in the relevant art to effect such feature, structure, or characteristic in connection with other embodiments whether or not explicitly described.

Disclosed herein is an exemplary system for organizing a browser environment. A browser environment may include a computing environment in which any number windows and/or tabs may be used to access various webpages (of one or more websites) and/or other documents. For example, a user may use a browser to access the Internet. The user may open a webpage in a tab of a window of the browser. Internet users often, however, do not access a single webpage at a time. Rather, many Internet users will access, or otherwise have open in their computing environment, multiple webpages spread across multiple tabs and/or windows of a browser.

As the number of webpages a user has open at any given time increases, so too does the difficulty in managing the open tabs and/or windows. For example, it may become difficult for a user to remember, amongst other things, which webpages are open, in which window and/or tab the webpages have been opened, and for what purpose the webpage was being accessed. Conventionally, the only ways to resolve this issue is by the user either performing a trial-and-error process, where the user manually opens and scrolls through each of the open tabs in each of the open windows until the user finds the webpage/tab for which the user was looking, or relying on his/her memory to remember which webpage is opened in which tab of which window.

FIG. 1 is a block diagram illustrating a system 100 for organizing a browser environment, according to an example embodiment. System 100 may organize windows 106, tabs 104 and/or webpages 112 of a browser 108 based on the preferences of a user 102. System 100 may allow user 102 to specify groupings 110 by which to organize tabs 104 and/or webpages 112 of one or more windows 106. Based on groupings 110, system 100 may then arrange the open tabs 104 and/or webpages 112 amongst one or more windows 106, to form one or more grouped windows 107. A grouped window 107 may include the tabs 104 and/or webpages 112 belonging to a particular grouping 110. System 100 may then tag each grouped window 107 with an identifier 114 that allows user 102 to more easily determine which grouping 110 is associated with which grouped window 107, and correspondingly which tabs 104 and/or webpages 112 are included or opened within the grouped window(s) 107.

As referenced above, system 100 may allow user 102 to sort or otherwise group tabs 104 and/or webpages 112 into groupings 110. As will be discussed in greater detail below, a tab 104 may be a navigational unit within a window 106 used to view or access a webpage 112. For example, a user may view a first webpage 112 of a website in a tab 104, and then later view a second webpage 112 of a website (e.g., replacing the first webpage) in the same tab. The first webpage 112 and the second webpage 112 may be webpages from the same website or different websites, where each website includes one or more webpages 112. As such, tabs 104 may act as proxies for accessing webpages 112, and webpages 112 may act as proxies for grouping websites and/or may themselves be grouped or otherwise organized into groupings 110.

For purposes of this description, when reference is made to a grouping 110 being applied to a tab 104, it should be understood that the grouping 110 is being simultaneously applied to the corresponding webpage 112 of the tab 104, where the tab 104 may be acting as proxy for accessing its corresponding webpage 112 and/or website. Further when references are made to groupings 110 are being applied to webpages 112, it should be understood that grouping 110 may be applied to the specific webpage 112 active within a tab 104 and/or the corresponding website (or portion thereof) of the webpage 112. According to an example embodiment, user 102 may choose whether a grouping 110 applies to the entire website of a webpage 112 appearing in a tab 104, or only the specific webpage 112 being displayed. If, for example, a grouping 110 is applied to an entire website, then all the webpages of that website may be associated with that grouping 110.

User 102 may include any user of system 100. User 102 may include any individual, group of individuals (who may be situated in diverse geographical locations), organization, and/or automated or semi-automated system that accesses or uses system 100. User 102 may access webpages 112, which may be displayed in tabs 104 of one or more windows 106 of browser 108.

Webpage 112 may include any document, website, or other information suitable for display. Webpage 112 may include, amongst other elements, text, hyperlinks, images, video, audio and/or other media. For example, webpage 1 may be the home page for a website being accessed by user 102. Webpage 112 may include at least a portion of a website. A website may include one or more webpages that may be viewed and/or otherwise accessed via tabs 104. According to an example embodiment, as referenced above, a grouping 110 of a webpage 112 may or may not include all the webpages of a particular website.

Tab 104, as referenced above, may include a navigational element or widget that may be used to switch between different documents and/or webpages 112 displayed within a window 106. For example, tab T1, which may be the active tab in window 106A, may be used to access webpage 1 as displayed. However, if tab T2 is activated, tab T2 may be used to access webpage 2 (not shown). Each window 106 may include one or more tabs 104, and each tab 104 may be used to access a webpage 112. In an example embodiment, tabs 104 may be moved from one window 106 to another while the corresponding webpage 112 remains the same. For example, tab T4 in window 106B may be moved to window 106A and still correspond to webpage 4. According to an example embodiment, when a tab 104 is moved between windows 106, the corresponding webpage 112 may be updated whereby its content may be reloaded from its source or server.

Each window 106 may include one or more tabs 104. During its operation, browser 108 may be associated with one or more windows 106. A window 106 may include a visual display, usually including an interface through which user 102 may interact with webpages 112 displayed in tabs 104. As shown, multiple windows 106 may be opened and/or otherwise operating simultaneously. Windows 106 may include windows of an application such as browser 108.

Browser 108 may include an application such as a web browser used for retrieving, presenting, and/or traversing information from one or more resources. For example, browser 108 may enable user 102 to access information resources via one or more networks 116.

Network 116 may include any communications network over which browser 108, and/or a device on which browser 108 may be operating, can send, receive and/or otherwise access information from one or more sources. Network 116 may include a wired, wireless, local area, wide area, cellular and/or other network. For example, browser 108 may be an application operating on a mobile phone, whereby browser 108 receives information, such as content for webpages 112, over a cellular network that allows access to the Internet or other network.

It should be understood that although system 100 is discussed herein as being used with browser 108 to access webpages 112 over network 116, system 100 may be applicable in other non-browser based embodiments as well. In an example embodiment, system 100 may be used to organize multiple windows or documents of an application, such as a word processing application. For example, user 102 may have numerous documents open in various word processing tabs across one or more word processing windows, where each document is associated with one or more projects on which user 102 is working. User 102 may then use system 100, as described herein, to organize the tabs of the word processing documents similarly to how system 100 may be used to organize tabs 104 of webpages 112 into one or more groupings 110.

Each grouping 110 includes a set, subset, class, category or other structure by which to organize tabs 104. Groupings 110 may be user-defined and/or system provided or system generated. For example, user 102 may create three groupings 100 based on the fact that user 102 may be working on three different projects, and thus create a grouping 110 for each project. Groupings 110 may be created at any time before, during, and/or after usage of browser 108. For example, groupings 110 may be created before any webpages 112 have been opened in tabs 104 of windows 106 and/or after several different tabs 104 and windows 106 have already been opened.

Each grouping 110 may be labeled or otherwise tagged with an identifier 114. Identifier 114 may include a label that differentiates groupings 110 from one another and/or identifies a grouping 110 to user 102. Identifier 114 may include any visual and/or audio indicator that identifies a grouping 110. For example, identifier 114 may include an alpha-numeric string of characters/symbols and/or a visual icon or image. According to an example embodiment, identifier 114 may include an audio identifier such that when a grouped window 107 is selected, an audio tone plays that identifies and/or differentiates the corresponding grouping 110.

In an example embodiment, user 102 may be working on several different projects, each of which may be designated in system 100 with a different grouping 110. A first grouping 110 may be labeled or tagged with "Finances" to indicate that those tabs 104 of the first grouping are being used for finance purposes. A second grouping 110 may be labeled "Work" to indicate that those tabs 104 of the second grouping being used for the user's work. A third grouping 110 may be identified by an image of the user's child to indicate that those tabs 104 of the third grouping are associated with the user's child.

Though user 102 may use any label user 102 sees fit to identify groupings 110, it would be most helpful for user 102 to provide an identifier 114 that is both unique to a grouped window 107 and relevant to either the subject matter or content of the tabs 104 (i.e., webpages 112) and/or the user's intended usage thereof. To maximize utility of identifiers 114, identifiers 114 should allow user 102 to quickly determine which tabs 104 are likely included in a particular grouped window 107.

Identifiers 114 may include any identifiers or labels. For example, user 102 may provide any text or image that will enable the user to more quickly determine what subset of tabs 104 are included in which window 106. In another example embodiment, user 102 may select from a system-provided list of identifiers 114 that may be applied to one or more windows 106. Or, for example, system 100 may automatically assign identifiers 114 to various windows 106 based on groupings 110 and/or an analysis of the contents of the webpages 112 opened in tabs 104. In another example embodiment, user 102 may change the visual appearance and/or emphasis or color of particular identifiers 114 to indicate varying level of importance to user 102.

Identifiers 114 may allow user 102 to more quickly identify which grouped window 107 user 102 needs to access in order to find the corresponding tab 104 or webpage 112 for which user 102 is looking. For example, briefly scrolling over and/or otherwise selecting each grouped window 107 using a device such as a mouse may cause identifier 114 to appear on a display device. Then, rather than having to select each tab 104 within a window 106, user 102 can quickly determine the grouping 110 of the grouped window 107 to determine which tabs 104 are likely opened within the window 107. This may prevent user 102 from having to open various windows 106, and manually scroll through the tabs 106 of each window 106 to determine which one has opened the webpage(s) 112 for which user 102 is searching.

Grouped window 107 may include a window similar to a window 106, as described above, except that the tabs 104 of grouped window 107 correspond to only those tabs 104 of a grouping 110. Further, grouped window 107 may be tagged with an identifier 114 corresponding to the grouping 110 of the grouped window 107. For example, as shown in the example of FIG. 1, grouped window 107 may be tagged with identifier 114A, which may be "news." Then for example, when user 102 sees identifier 114A as being "news", user 102 would know that tabs T1, T2 and T4 likely correspond to different news webpages 112.

An identifier module 122 may set, define or otherwise apply any rules associated with creating an identifier 114 for a grouping 110. For example, identifier model 122 may limit the lengths, characters and/or file sizes of identifiers 114. In an example embodiment, identifier module 122 may provide a concatenated, or otherwise shortened or abbreviated, version of an identifier 114.

User 102 may use selection tool 120 to select which tabs 104 belong to or are otherwise associated with which grouping 110. Selection tool 120 may include any functionality that allows user 102 to arrange tabs 104 into groupings 110. For example, selection tool 120 may allow user 102 to drag-and-drop tabs 104 from windows 106 onto a particular or desired grouping 110. Selection tool 120 may allow user 102 to identify which tabs 104 of which windows 106 belong to which groupings 110.

A positioner 124 may position and/or otherwise arrange the tabs 104 belonging to a particular grouping 110 into a grouped window 107 for that grouping 110. For example, after user 102 selects which tabs 104 belong to a grouping 110, positioner 124 may arrange those tabs into a grouped window 107 for that grouping 110. In an example embodiment, if during usage, user 102 opens new tabs 104 and/or new webpages 112, positioner 124 may rearrange the opened tabs 104 into grouped windows 107 based on associated groupings 110. In another example embodiment, positioner 124 may move newly opened and/or created tabs 104 and/or webpages 112 to previously determined groupings 110. For example, a webpage 112 opened in a new tab 104 may have been previously grouped into a particular grouping 110. Then for example, positioner 124 may move the new tab 104 into the grouped window 107 corresponding to the particular grouping 110. According to an example embodiment, not only may positioner 124 move or arrange tabs into a grouped window 107, but positioner 124 may also order or sort the tabs 104 within a grouped window 107 based on a user's preferences.

Tagging engine 124 may tag tabs 104 and/or windows 106 based on groupings 110 and/or identifiers 114. For example, tagging engine 124 may associate metadata with various tabs 104 (e.g., webpages 112). The metadata indicates with which grouping 110 the tabs 104 are associated. In an example embodiment, tagging engine 124 may apply identifier 114 to the grouped window 107 as identifier 114A. In another example embodiment, tagging engine 124 may further apply identifiers 114 to the tabs 104 (e.g., T1, T2, T4) of grouped window 107.

Windows 106 may be displayed in a graphical user interface (GUI) 118. GUI 118 may include any interface or other display for viewing and/or interacting with windows 106. GUI 118 may include a screen of a laptop or touch-screen device, or other monitor through which user 102 interacts with windows 106 and tabs 104 using an interface device such as a mouse, keyboard, stylus and/or user's finger.

In the example of FIG. 1, two GUIs 118A and 118B are shown. GUIs 118A and 118B may illustrate GUIs according to an example embodiment, where GUI 118A represents a GUI prior to organization of its browser interface, and GUI 118B represents the GUI 118A after organization of its browser interface into one or more grouped windows 107.

In GUI 118A, window 106A may include tabs T1, T2 and T3, and window 106B may include tabs T4 and T5. User 102 may determine that the webpages 112 corresponding to tabs T1, T2 and T4 are related, as they are all "News" websites. User 102 may then create a new grouping 110, and use selection tool 120 to select tabs T1, T2 and T4 to include in that grouping. For example, user 102 may manually move tab T4 into window 106A and move T3 into a new window 106, and indicate the tabs T1, T2 and T4 in window 106A all belong to the new grouping 110, for which user may provide the identifier "News" to be applied to that grouping 110.

In another example embodiment, selection tool 120 may allow user 102 to indicate which tabs 104 belong to a grouping 110 without physically rearranging the tabs 104 amongst the windows 106. For example, selection tool 120 may provide a selection screen or window, whereby user 102 may select which tabs 104 belong to which grouping(s) 110. Positioner 124 may arrange the grouped tabs (e.g., T1, T2 and T4) into one or more grouped windows 107, and tagging engine 126 may tag the windows with the associated identifiers 114 (e.g., as grouped window 107 has been tagged with identifier 114A "News"). Ungrouped tabs, as shown in GUI 118B, may remain or otherwise be placed in windows 106C and 106D. When user 102 is viewing GUI 118B, user 102 may quickly determine which of the windows (e.g., 107, 106C and/or 106D) is likely to contain an open webpage pertaining to world news, for example.

In another example embodiment, user 102 may activate selection tool 120 to automatically group tabs 104 based on the underlying content of their webpages 112. Comparator 121 may compare information extracted from the webpages 112 of the open tabs 104 across one or more windows 106 (as may be indicated or selected by user 102) to determine how the webpages 112 are similar and/or different. Comparator 121 may then suggest or automatically proceed with organizing the open tabs 104 into various groupings 110 based on any number of comparison criteria for the content or metadata of the webpages 112.

For example, comparator 121 may determine metadata about the webpages 112, and then based on a comparison of the metadata determine various groupings 110 for the webpages 112. The metadata of the webpages 112 may include, for example, keywords and/or phrases used to search for the webpages 112 using one or more search engines. Further, identifier module 122 may suggest one or more identifiers 114 for each grouping 110 based on the compared metadata (or other content).

In an example embodiment, user 102 provides a number of groupings 110 that user 102 desires. Selection tool 120 may then group the open tabs into that number of groupings 110. In another example embodiment, user 102 applies identifiers 114 to various groupings 110. Comparator 121 may then sort the open tabs 104 into groupings 110 based on which webpages 112 correspond to which identifiers 114 of the groupings 110. User 102 may then have an opportunity to adjust, confirm, or otherwise modify the groupings 110 as determined by selection tool 120.

Comparator 121 may track and/or otherwise compare changes that occur to a grouped window 107 over time and/or through usage. Comparator 121 may allow groupings 110 to be updated based on changes to grouped windows 107. In an example embodiment, after creating groupings 110 and arranging the grouped tabs into grouped windows 107, user 102 may continue using browser 108 to visit other webpages 112 that may not currently be open, may rearrange the existing tabs, open new tabs and/or close opened tabs 104 and/or grouped windows 107. Comparison logic 107 may then update groupings 110 based on the changes that may have occurred amongst the tabs 104 and/or grouped windows 107 during usage. For example, in GUI 118B, if a new tab T6 is created and added to grouped window 107, then comparator 121 may update the corresponding grouping 110 to include the new tab T6.

Updates by comparator 121 may occur continuously (e.g., as changes are being made to the grouped windows 107 and/or tabs 104), periodically (e.g., at the occurrence of particular events and/or the passage of time intervals), and/or upon a request by user 102 to update the groupings 110. According to an example embodiment, rather than using comparator 121 to update groupings 110 based on usage of the browser environment, user 102 may alternatively restore the grouped windows 107 to their pre-usage state based on previously defined groupings 110. New tabs 104 and/or windows 107 may then be opened, existing tabs 104 and/or windows 106 may be closed, and/or tabs 104 may be moved between windows 106, 107 to restore GUI 118B to its state prior to usage or rearrangement of one or more tabs 104 and/or windows 107.

In an example embodiment, sharing engine 128 allows user 102 to assign permissions 130 to share grouped window 107 with one or more other users. The other users may then be able to view, modify, update and/or otherwise access the grouped window 107 depending on which actions they have been authorized to perform by user 102.

User 102 may assign permissions 130 allowing various users varying levels of access to view and/or modify grouped window 107. For example, user 102 may have assembled a collection of webpages 112 that user 102 believes to be an excellent primer on a particular subject matter, such as basic car repair. User 102 may then group the webpages 112 together into a grouping 110 and share, with one or more other users, a grouped window 107 associated with the grouping 110. User 102 may, for example, set permissions 130 for allowing access to the grouped window 107 using sharing engine 128. User 102 may then post a hyperlink, an icon, or another representation of the grouping for accessing the grouped window 107. When the other authorized users click or open the representation, the other users may be provided the grouped window 107 as assembled by user 102.

According to an example embodiment, when an authorized user (e.g., a user who has been provided permissions 130 to open and/or otherwise access grouped window 107) opens or selects a representation of the shared grouped window 107, a new grouped window 107 may open within the shared user's GUI 118. For example, a new grouped window 107 may open and automatically populate tabs (e.g., T1, T2 and T4) corresponding to shared webpages 112 of the shared grouped window 107. In an example embodiment, if a shared user's GUI 118, browser 108, and/or window 106 does not support tagging grouped window 107 with identifier 114A, then grouped window 107 may nonetheless open and populate with the corresponding tabs 104 but without identifier 114A.

Figure 2:
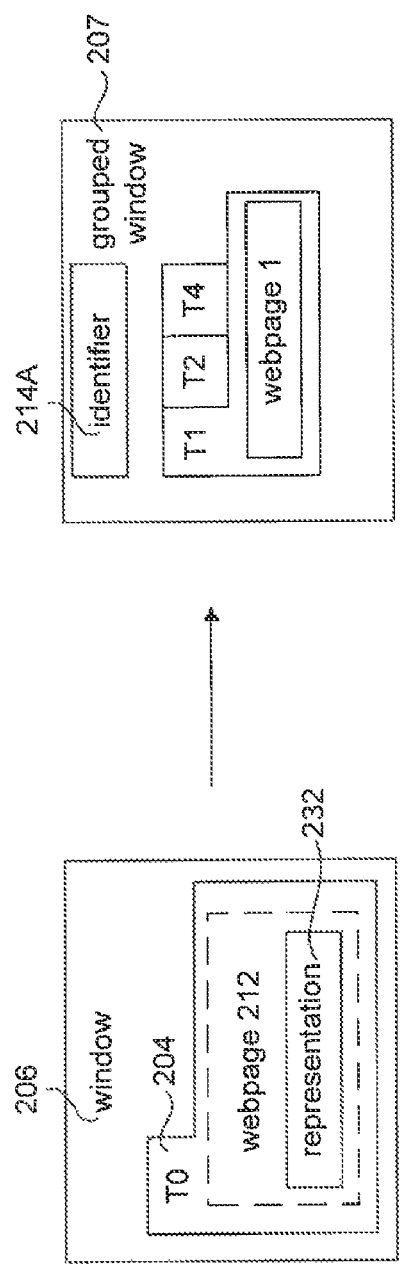
FIG. 2 is an example usage of a grouped window according to an example embodiment.

FIG. 2 is an example usage 200 of a grouped window 207 according to an example embodiment. In the example usage 200, a user has created a grouped window 207 with tabs T1, T2 and T4.

According to an example embodiment, representation 232 may include a representation of grouped window 207. Sharing engine 128 may create representation 232 and have permissions 130 associated with its usage. Representation 232 may include, for example, a hyperlink, icon, or a file that when opened, opens grouped window 207 on an authorized user's computing environment. Representation 232 may include an icon on a user's computing desktop that when opened or clicked opens grouped window 207. Or for example, representation 232 may be embedded in a webpage 212 and/or e-mail between users that when clicked or accessed opens a new grouped window 207.

According to an example embodiment, representation 232 may be a bookmark that may be selected by user 102. For example, user 102 may have assembled grouped window 207. If user 102 wants to later reference the webpages of grouped window 207, user 102 may save representation 232 as a bookmark. A bookmark may include a pointer, or address such as a hyperlink, that may be selected by a user of a browser 108 to quickly load or visit one or more a webpages 212 without having to type in the address of the webpage into the browser 108. In an example using representation 232 as a bookmark, rather than directing user 102 to a specific webpage 112, the representation bookmark may open a new grouped window 207 including grouped tabs T1, T2 and T4 in the user's browser environment. In another embodiment, for example, upon a selection of bookmark representation 232, the tabs of grouped window 207 may open as new tabs in the same window 207 from which the bookmark was selected or replace existing tabs in the window 206.

According to another example embodiment, representation 232 may be provided for selection when user 102 opens a new tab 204 and/or window 206. For example, when user 102 opens a new tab 204, the new tab may either open to a default homepage or webpage 112, or may open without a homepage. In this case, the new tab may allow a user to select one or more links to webpages, such as bookmarks and/or previously viewed webpages to which user 102 may quickly navigate. One or more of the links available for selection by user 102 may include representations 232 of one or more shared groupings 207.

Figure 3:
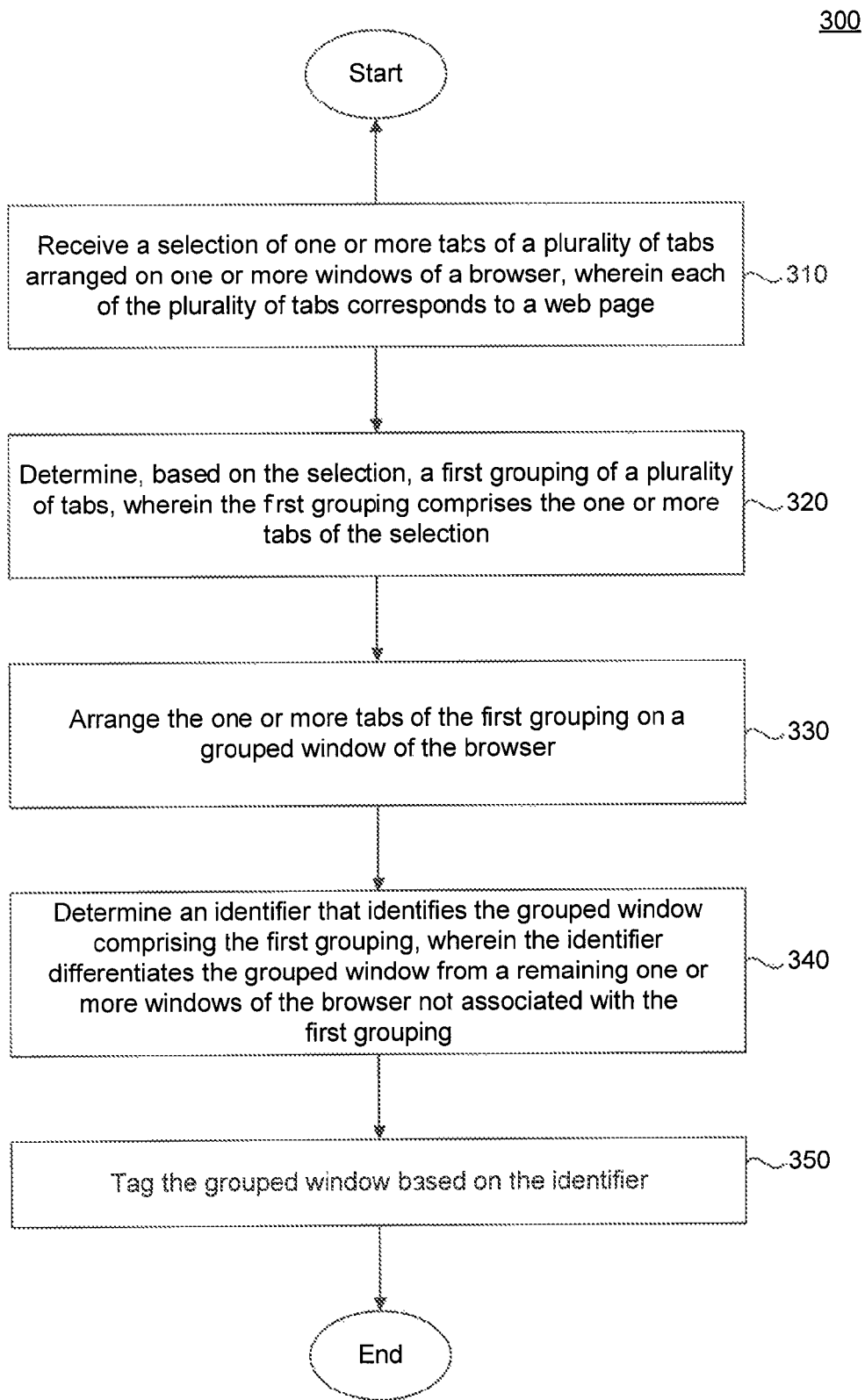
FIG. 3 is a flow chart of a process of organizing a browser environment, according to an example embodiment.

FIG. 3 is a flow chart of a process of organizing a browser environment, according to an example embodiment. At stage 310, a selection of one or more tabs of a plurality of tabs arranged on one or more browser windows of a browser is received, wherein each of the plurality of tabs corresponds to a web page. For example, selection tool 120 may receive a selection of tabs T1, T2 and T4 arranged within windows 106A and 106B. The tabs 104 may each correspond to webpages 112, where for example, tab T1 corresponds to webpage 1, and tab T4 corresponds to webpage 4.

At stage 320, based on the selection, a first grouping of a plurality of tabs is determined, wherein the first grouping includes the one or more tabs of the selection. For example, a first grouping 110 may be created, and tabs T1, T2, and T4, as selected may be included in the first grouping 110.

At stage 330, the one or more tabs of the first grouping are arranged on a first window of the browser. For example, positioner 124 may arrange the selected tabs T1, T2 and T4 in grouped window 107.

At stage 340, an identifier that identifies the first window including the first grouping is determined, wherein the identifier differentiates the first window from a remaining one or more windows of the browser not associated with the first grouping. For example, identifier module 122 may receive or determine identifier 114A that identifies the first grouping 110. Identifier 114A may differentiate the grouped window 107 from the other browser windows 106C and 106D and/or other grouped windows 107 (not shown). Identifier 114A may be received from user 102, or may be determined automatically based on the content of tabs T1, T2, and T4.

At stage 350, the first window is tagged based on the identifier. For example, tagging engine 126 may tag grouped window 107 with identifier 1114A.

Figure 4:
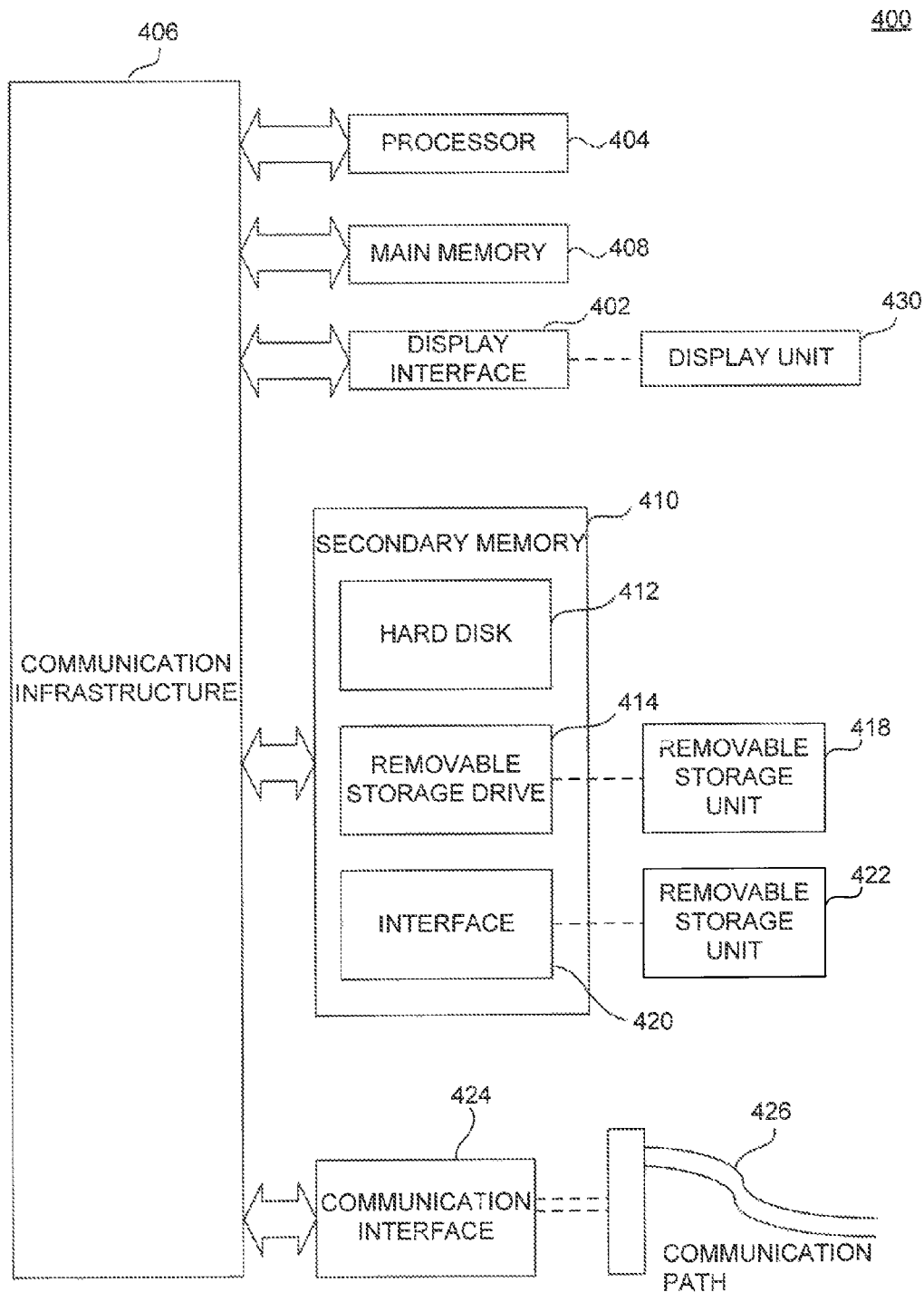
FIG. 4 is a system diagram that can be used to embody or implement embodiments described herein.

FIG. 4 illustrates an example computer system 400 in which embodiments as described above, or portions thereof, may be implemented. For example, browser 108, including portions thereof, may be implemented in computer system 400 using hardware, software, firmware, tangible computer readable media having instructions stored thereon, or a combination thereof and may be implemented in one or more computer systems or other processing systems. Hardware, software, or any combination of such may embody any of the modules, procedures and components in FIGS. 1-3.

One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

For instance, a computing device having at least one processor device and a memory may be used to implement the above-described embodiments. A processor device may be a single processor, a plurality of processors, or combinations thereof. Processor devices may have one or more processor "cores."

Various embodiments of the invention are described in terms of this example computer system 400. After reading this description, it will become apparent to a person skilled in the relevant art how to implement embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As will be appreciated by persons skilled in the relevant art, processor device 404 may also be a single processor in a multi-core/multiprocessor system, such system operating alone, or in a cluster of computing devices operating in a cluster or server farm. Processor device 404 is connected to a communication infrastructure 406, for example, a bus, message queue, network, or multi-core message-passing scheme.

Computer system 400 also includes a main memory 408, for example, random access memory (RAM), and may also include a secondary memory 410. Secondary memory 410 may include, for example, a hard disk drive 412, removable storage drive 414. Removable storage drive 414 may include a floppy disk drive, a magnetic tape drive, an optical disk drive, a flash memory, or the like. The removable storage drive 414 reads from and/or writes to a removable storage unit 418 in a well-known manner. Removable storage unit 418 may include a floppy disk, magnetic tape, optical disk, etc. which is read by and written to by removable storage drive 414. As will be appreciated by persons skilled in the relevant art, removable storage unit 418 includes a computer readable storage medium having stored thereon computer software and/or data.

Computer system 400 (optionally) includes a display interface 402 (which can include input and output devices such as keyboards, mice, etc.) that forwards graphics, text, and other data from communication infrastructure 406 (or from a frame buffer not shown) for display on display unit 430.

In alternative implementations, secondary memory 410 may include other similar means for allowing computer programs or other instructions to be loaded into computer system 400. Such means may include, for example, a removable storage unit 422 and an interface 420. Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to computer system 400.

Computer system 400 may also include a communications interface 424. Communications interface 424 allows software and data to be transferred between computer system 400 and external devices. Communications interface 424 may include a modem, a network interface (such as an Ethernet card), a communications port, a PCMCIA slot and card, or the like. Software and data transferred via communications interface 424 may be in the form of signals, which may be electronic, electromagnetic, optical, or other signals capable of being received by communications interface 424. These signals may be provided to communications interface 424 via a communications path 426. Communications path 526 carries signals and may be implemented using wire or cable, fiber optics, a phone line, a cellular phone link, an RF link or other communications channels.

Embodiments also may be directed to computer program products including software stored on any tangible computer readable storage medium. Such software, when executed in one or more data processing device, causes a data processing device(s) to operate as described herein. Embodiments of the invention employ any computer useable or readable medium. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, and optical storage devices, MEMS, nanotechnological storage device, etc.).

It would also be apparent to one of skill in the relevant art that embodiments, as described herein, can be implemented in many different embodiments of software, hardware, firmware, and/or the entities illustrated in the figures. Any actual software code with the specialized control of hardware to implement embodiments is not limiting of the detailed description. Thus, the operational behavior of embodiments will be described with the understanding that modifications and variations of the embodiments are possible, given the level of detail presented herein.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The Summary and Abstract sections may set forth one or more but not all exemplary embodiments of the present invention as contemplated by the inventor(s), and thus, are not intended to limit the present invention and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method comprising:
  receiving a selection of one or more tabs of a plurality of tabs arranged on one or more windows of a browser, wherein each of the plurality of tabs corresponds to a web page;
  determining, based on the selection, a first grouping of a plurality of tabs, wherein the first grouping comprises the one or more tabs of the selection;
  arranging the one or more tabs of the first grouping on a grouped window of the browser, wherein the grouped window comprises a plurality of tabs consisting of only one grouping;
  determining an identifier that identifies the grouped window, wherein the identifier differentiates the grouped window from a remaining one or more windows of the browser not associated with the first grouping;
  tagging the grouped window based on the identifier; and
  providing the grouped window tagged with the identifier capable of being used in a web page or another browser window, wherein the grouped window, including the selected one or more tabs, opens responsive to an open command.

2. The computer-implemented method of claim 1, wherein the tagging comprises:
  receiving a plurality of selections, including a first selection and a second selection, wherein each of the plurality of selections is of one or more tabs of the plurality of tabs;

tagging a first grouped window of the browser, including one or more of the plurality of tabs associated with the first selection, based on a first identifier; and tagging a second grouped window of the browser, including one or more of the plurality of tabs associated with the second selection, based on a second identifier.

3. The computer-implemented method of claim 1, wherein the grouped window is one of the one or more browser windows.

4. The computer-implemented method of claim 1, wherein the grouped window is a new browser window.

5. The computer-implemented method of claim 1, wherein the determining the identifier comprises receiving the identifier from a user.

6. The computer-implemented method of claim 1, wherein the determining the identifier comprises determining that the identifier comprises at least one of text and an icon that represents the first grouping.

7. The computer-implemented method of claim 1, further comprising:

providing the identifier identifying the grouped window when presenting two or more of the windows of the browser, including the grouped window.

8. The computer-implemented method of claim 1, further comprising:

providing a representation of the grouped window tagged with the identifier in a second window of the browser, wherein the grouped window, including the selected one or more tabs, opens responsive to an open command associated with the representation.

9. The computer-implemented method of claim 1, wherein the tagging comprises:

determining that the identifier exceeds a maximum identifier size;

determining a condensed identifier based on the identifier, wherein the condensed identifier does not exceed the maximum identifier size; and tagging the first browser window with the condensed identifier.

10. The computer-implemented method of claim 1, wherein the tagging comprises tagging each of the one or more tabs of the first window based on the identifier.

11. The computer-implemented method of claim 1, further comprising:

receiving an open command, as submitted by a first user, associated with a representation of the tagged grouped window as shared on a web page by a second user; and providing to the first user, responsive to the open command, the grouped window including the one or more tabs of the selection.

12. The computer-implemented method of claim 11, wherein the providing, comprises determining that the first user is authorized by the second user to access the tagged grouped window.

13. The computer-implemented method of claim 1, further comprising:

receiving a second selection of a second tab, wherein the second tab is arranged on a second window of the browser, wherein the grouped window is distinct from the second window;

determining, based on the second selection, that the second tab is associated with the first grouping; and moving the second tab to the grouped window, wherein the second tab is arranged with the one or more tabs of the grouped window.

14. The computer-implemented method of claim 1, wherein the determining an identifier comprises determining the identifier based on a content of each of the web pages corresponding to the one or more tabs of the selection.

15. The computer-implemented method of claim 1, wherein the tagging comprises tagging each of the web pages corresponding to the one or more tabs of the grouped window based on the identifier.

16. The computer-implemented method of claim 15, further comprising:

receiving an open command to open one of the tagged web pages in a new tab arranged on one of the browser windows; and arranging the tagged web page on the grouped window based on the tagging.

17. A computer readable storage medium having code stored thereon that, when executed by one or more processors, causes the one or more processors to arrange one or more tabs of a browser, corresponding to one or more web pages, into groupings tagged with identifiers that differentiate a first grouping from a second grouping, the code comprising:

a selection tool configured to allow a user to select at least one of one or more tabs and one or more web pages corresponding to the one or more tabs for arrangement into one or more groupings;

an identifier module configured to determine an identifier for each of the one or more groupings, wherein the identifier differentiates the first grouping from a second grouping;

a tagging engine configured to tag the selections of each grouping based on the identifier; and a positioner configured to determine that a first selection has been tagged with a first identifier corresponding to a first grouping, and arrange the first selection in a grouped window tagged with the first identifier and corresponding to the first grouping, wherein the grouped window comprises a plurality of tabs consisting of only one grouping;

wherein the grouped window is provided tagged with the identifier and is capable of being used in a web page or another browser window, wherein the grouped window, including the selected one or more tabs, opens responsive to an open command.

18. The computer readable storage medium of claim 17, wherein:

the tagging engine is further configured to tag the selections with metadata not visible to the user; and the positioner is further configured to arrange the selections based on the metadata.

19. The computer readable storage medium of claim 17, further comprising:

a sharing engine configured to allow a first user to set permissions for sharing the first grouping with one or more other users.

20. A system comprising:

a processor; and a memory having instructions stored thereon that, when executed by the processor, cause the processor to perform operations comprising:

receiving a selection of one or more tabs of a plurality of tabs arranged on one or more browser windows of a browser, wherein each of the plurality of tabs corresponds to a web page;

determining, based on the selection, a first grouping of a plurality of tabs, wherein the first grouping comprises the one or more tabs of the selection;

arranging the one or more tabs of the first grouping on a grouped window of the browser, wherein the grouped window comprises a plurality of tabs consisting of only one grouping;
determining an identifier that identifies the grouped window, wherein the identifier differentiates the grouped window from a remaining one or more browser windows not associated with the first grouping;
tagging the grouped window based on the identifier; and
providing the grouped window tagged with the identifier capable of being used in a web page or another browser window, wherein the grouped window, including the selected one or more tabs, opens responsive to an open command.

* * * * *